United States Patent
Jenkins et al.

(10) Patent No.: US 10,302,847 B2
(45) Date of Patent: May 28, 2019

(54) MICRO INJECTION-MOLDED ARTICLES

(71) Applicant: Microsoft Technology Licensing, LLC, Redmond, WA (US)

(72) Inventors: Kurt A. Jenkins, Sammamish, WA (US); Lincoln M. Ghioni, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 57 days.

(21) Appl. No.: 14/720,205

(22) Filed: May 22, 2015

(65) Prior Publication Data
US 2016/0341884 A1    Nov. 24, 2016

(51) Int. Cl.
| | | |
|---|---|---|
| *F21V 7/04* | (2006.01) | |
| *F21V 8/00* | (2006.01) | |
| *B29D 11/00* | (2006.01) | |
| *G02B 27/01* | (2006.01) | |
| *B29C 45/37* | (2006.01) | |

(Continued)

(52) U.S. Cl.
CPC .......... *G02B 6/0065* (2013.01); *B29C 45/372* (2013.01); *B29C 45/73* (2013.01); *B29D 11/00663* (2013.01); *G02B 6/0036* (2013.01); *G02B 6/0038* (2013.01); *G02B 6/0043* (2013.01); *G02B 27/0172* (2013.01); *B29C 2045/0094* (2013.01);

(Continued)

(58) Field of Classification Search
CPC .. G02B 6/0038; G02B 27/01; G02B 27/0103; G02B 27/0101; G02B 27/0105; G02B 27/011; G02B 27/0112; G02B 27/0116; G02B 27/0118; G02B 27/0123; G02B 27/0127; G02B 27/0129; G02B 27/013; G02B 27/0147; G02B 27/0198; G02B 6/0033; G02B 6/0035; G02B 6/0036; G02B 6/004; G02B 6/0043; G02B 6/0065
USPC ........................................................ 362/619
See application file for complete search history.

(56) References Cited

U.S. PATENT DOCUMENTS 7,308,180 B2    12/2007 Fujii et al.
7,711,230 B2     5/2010 Khan
(Continued)

FOREIGN PATENT DOCUMENTS

WO    WO-2012070868    5/2012
WO    WO-2014022031    2/2014

OTHER PUBLICATIONS

"International Search Report and Written Opinion", Application No. PCT/US2016/029276, dated Jul. 29, 2016, 11 pages.
(Continued)

*Primary Examiner* — Anh T Mai
*Assistant Examiner* — Matthew J. Peerce
(74) *Attorney, Agent, or Firm* — Alleman Hall Creasman & Tuttle LLP

(57) ABSTRACT

In one or more embodiments, micro light guides are constructed that include a wall and one or more features extending from or protruding into one or more surfaces of the wall. The microstructure light guide is defined by a mold and formed as a single article with uniform internal stresses. In at least some embodiments, the mold that defines the microstructure light guide employs pixelated mold portions that enable selective temperature adjustment of discrete regions of the mold portions to form the microstructure light guide.

20 Claims, 8 Drawing Sheets

(51) Int. Cl.
 B29C 45/73 (2006.01)
 B29K 69/00 (2006.01)
 B29C 45/00 (2006.01)
(52) U.S. Cl.
 CPC ............. B29C 2045/7343 (2013.01); B29C 2045/7356 (2013.01); B29K 2069/00 (2013.01); G02B 2027/0118 (2013.01)

(56) References Cited

U.S. PATENT DOCUMENTS

| | | | |
|---|---|---|---|
| 7,794,117 B2* | 9/2010 | Cheng | F21V 5/007 362/326 |
| 8,641,934 B2 | 2/2014 | Yu et al. | |
| 2002/0048444 A1 | 4/2002 | Sung et al. | |
| 2002/0181224 A1 | 12/2002 | Tahara et al. | |
| 2005/0023433 A1* | 2/2005 | Ishitaka | B29C 33/565 249/134 |
| 2005/0049368 A1 | 3/2005 | Maruyama et al. | |
| 2006/0002675 A1 | 1/2006 | Choi et al. | |
| 2006/0285214 A1* | 12/2006 | Haga | B29D 11/00278 359/619 |
| 2008/0008422 A1 | 1/2008 | Joo et al. | |
| 2008/0144324 A1* | 6/2008 | Tahara | B29C 45/561 362/311.06 |
| 2008/0232135 A1 | 9/2008 | Kinder et al. | |
| 2008/0251957 A1 | 10/2008 | Ostergard | |
| 2009/0122229 A1* | 5/2009 | Kim | G02B 6/0038 349/65 |
| 2009/0135469 A1 | 5/2009 | Lee et al. | |
| 2012/0100339 A1 | 4/2012 | Haynes et al. | |
| 2013/0021226 A1* | 1/2013 | Bell | G02B 3/0006 345/8 |
| 2014/0104884 A1 | 4/2014 | Yan et al. | |
| 2014/0138516 A1 | 5/2014 | Chen | |
| 2014/0169000 A1 | 6/2014 | Hsu et al. | |
| 2014/0293653 A1 | 10/2014 | Wang | |
| 2014/0322379 A1 | 10/2014 | Hsu | |

OTHER PUBLICATIONS

Baz, "Pixelated High-Index Ring Bragg Fibers", In Proceedings of Optics Express, vol. 20, Issue 17, Aug. 1, 2012, 8 pages.

He, "Experimental Study on the Fabrication of the Light Guide Plate with Hot Embossing Method", In Proceedings: Applied Mechanics and Materials (vols. 37-38), Nov. 11, 2010, 6 pages.

Yokoi, "Effects of Molding Conditions on Transcription Molding of Microscale Prism Patterns Using Ultra-High-Speed Injection Molding", In Proceedings of Polymer Engineering & Science vol. 46, Issue 93, Sep. 2006, 7 pages.

"International Preliminary Report on Patentability Issued in PCT Application No. PCT/US2016/029276", dated Apr. 6, 2017, 7 Pages.

* cited by examiner

MICRO INJECTION-MOLDED ARTICLES

BACKGROUND

Light guides are wave guides configured to guide visible light via internal reflection. As computing devices continue to decrease in size, micro light guides are increasingly useful in providing a display for these computing devices. Conventional techniques for manufacturing light guides are limited in their ability to control production of the light guide sufficient to achieve desired engineering tolerances. This lack of control significantly increases when manufacturing micro light guides. As a result, further machining is often required in addition to the injection molding process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, light guides are constructed that include a wall and one or more features extending away from or protruding into one or more surfaces of the wall. The wall and the features are formed as a single article of a uniform material and are configured to receive light from and reflect the received light to a display surface.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Techniques described herein enable construction of micro injection-molded articles, such as light guides, without the need for additional machining. When using conventional injection molding techniques, controlling material viscosity becomes increasingly difficult at smaller portions of a mold cavity. When injection molding micro articles, which refer to structures having walls or features with a thickness of less than 100 micrometers, control becomes progressively more difficult as an injected material approaches thinner portions of the micro structure. Without the ability to control material viscosity, existing injection molding processes are unable to replicate surface geometry of the mold that defines the article to be formed. Plastic injection materials, for example, possess material properties that cause the injection material to condense upon cooling and "spring back" from a mold wall. Furthermore, the mold's temperature is typically cooler than a melting point of the injection material. This temperature differential causes the injection material to have a semi-solid skin at points of contact with the cool mold, preventing the material from fully propagating to fill the mold cavity's features.

An attempt at addressing these control problems in injection molding micro structures could be made using induction heating in the injection molding process. However, such an attempt may result in structure deformation beyond acceptable tolerance ranges. Alternative attempts could include layering multiple sheets of film atop one another to achieve the desired article structure. However, layering sheets of film can result in air gaps between sheets of film in the resulting structure.

Techniques described herein overcome these problems by enabling construction of micro articles through injection molding with sufficient control that reduces (or even eliminates) the need for additional machining. By using pixelated mold portions in a mold that defines the micro article, a temperature of discrete regions of the mold portions can be selectively adjusted to ensure that an injection material fully propagates to the micro features of the mold's cavity and produces high fidelity articles. This ability to selectively adjust a mold's temperature at discrete regions of the mold enables an injection material to be injected at lower pressures and at a lower flow rate than conventional molding techniques. Selective mold temperature adjustment thus reduces internal material stresses in an injection-molded article and reduces the corresponding forces exerted on a mold cavity during the injection process. Articles can thus be constructed as a single article of a uniform material having uniform material properties throughout and increased flatness and reduced internal stresses, in contrast to articles created with conventional processes.

Figure 1:
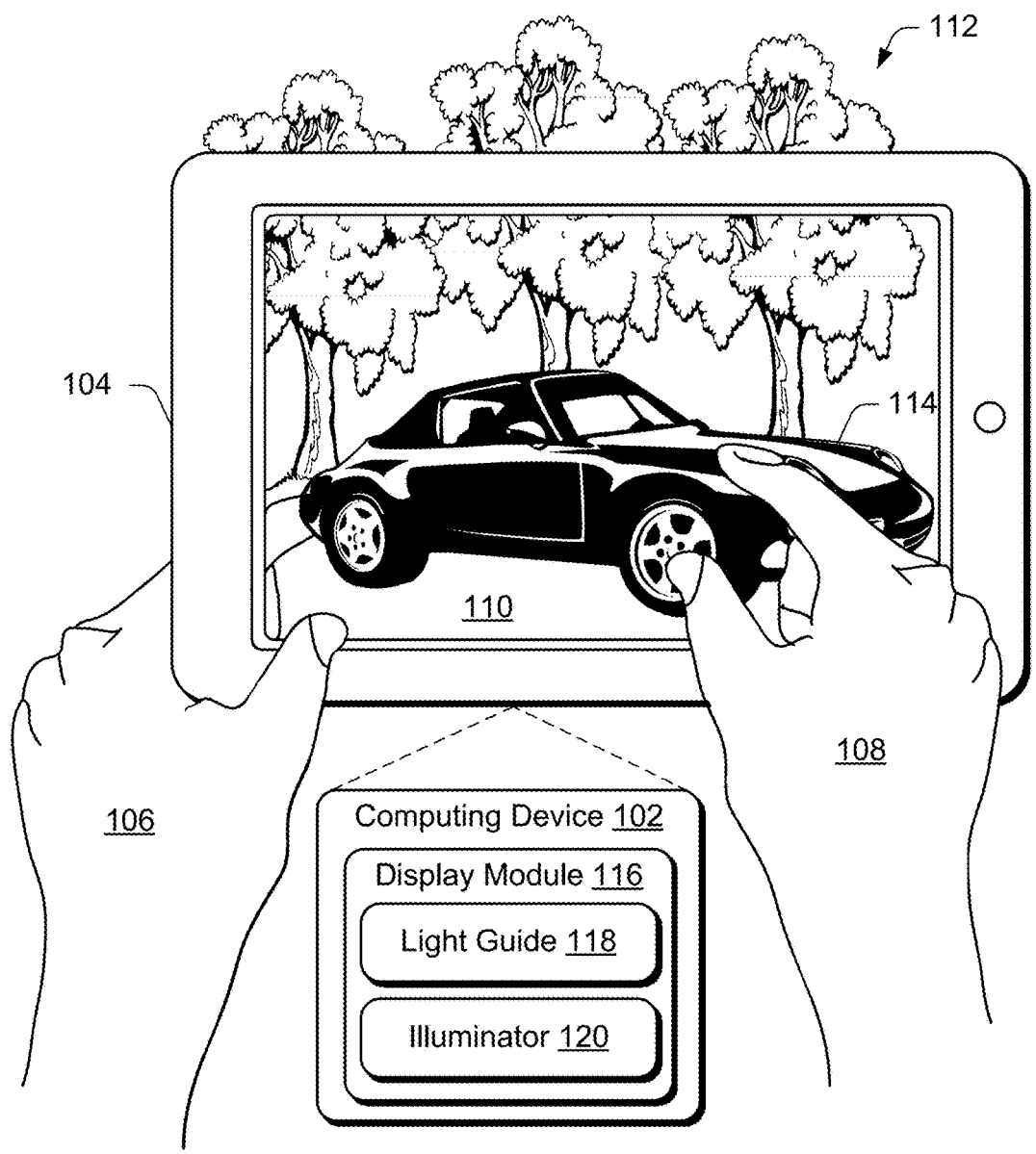
FIG. 1 illustrates an environment in an example implementation of a light guide in a computing device in accordance with one or more embodiments.

FIG. 1 illustrates an example environment 100 implementing a light guide in a computing device 102 in accordance with one or more embodiments. Although the computing device 102 is illustrated in a handheld form factor, the computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch, headset), an entertainment device (e.g., an entertainment appliance, a set-top box communicatively coupled to a display device, a game console), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

For example, the computing device 102 is configured in a handheld form factor to be held by one or more hands 106, 108 of a user as illustrated. Computing device 102 employs a housing 104 and a display surface 110. As illustrated, display surface 110 is optionally at least partially transparent. Computing device 102 further includes a display module 116, which includes a light guide 118 and an illuminator 120. Typically, an image is provided onto the display surface 110 via light provided by the illuminator 120 entering the light guide 118. Light provided by the illuminator 120 may enter the light guide 118 through an edge of the light guide, from behind the light guide, or elsewhere. Light rays from the illuminator 120 are internally reflected within the light guide 118 until they reach a critical angle at which the rays emerge onto the display surface 110 to illuminate an image. The illuminator 120 comprises one or more light sources, such as light emitting diode arrays, and so on. As illustrated in FIG. 1, a car 114 is depicted as being displayed by display surface 110 such that at least a portion of the displayed image and the physical surroundings 112 are simultaneously viewable using the display surface 110. Alternatively, the display surface 110 is not transparent, and the physical surroundings 112 are not viewable through the display surface 110.

As illustrated, the computing device 102 is an optics device that processes light waves from the illuminator 120 through use of the light guide 118 to display the image 114. However, this illustration is solely for purposes of example and an optics device is not limited to the specific configuration of computing device 102 illustrated in FIG. 1. As described herein, an optics device may be any device or instrument that processes or alters light waves to display an image for viewing.

Figure 2:
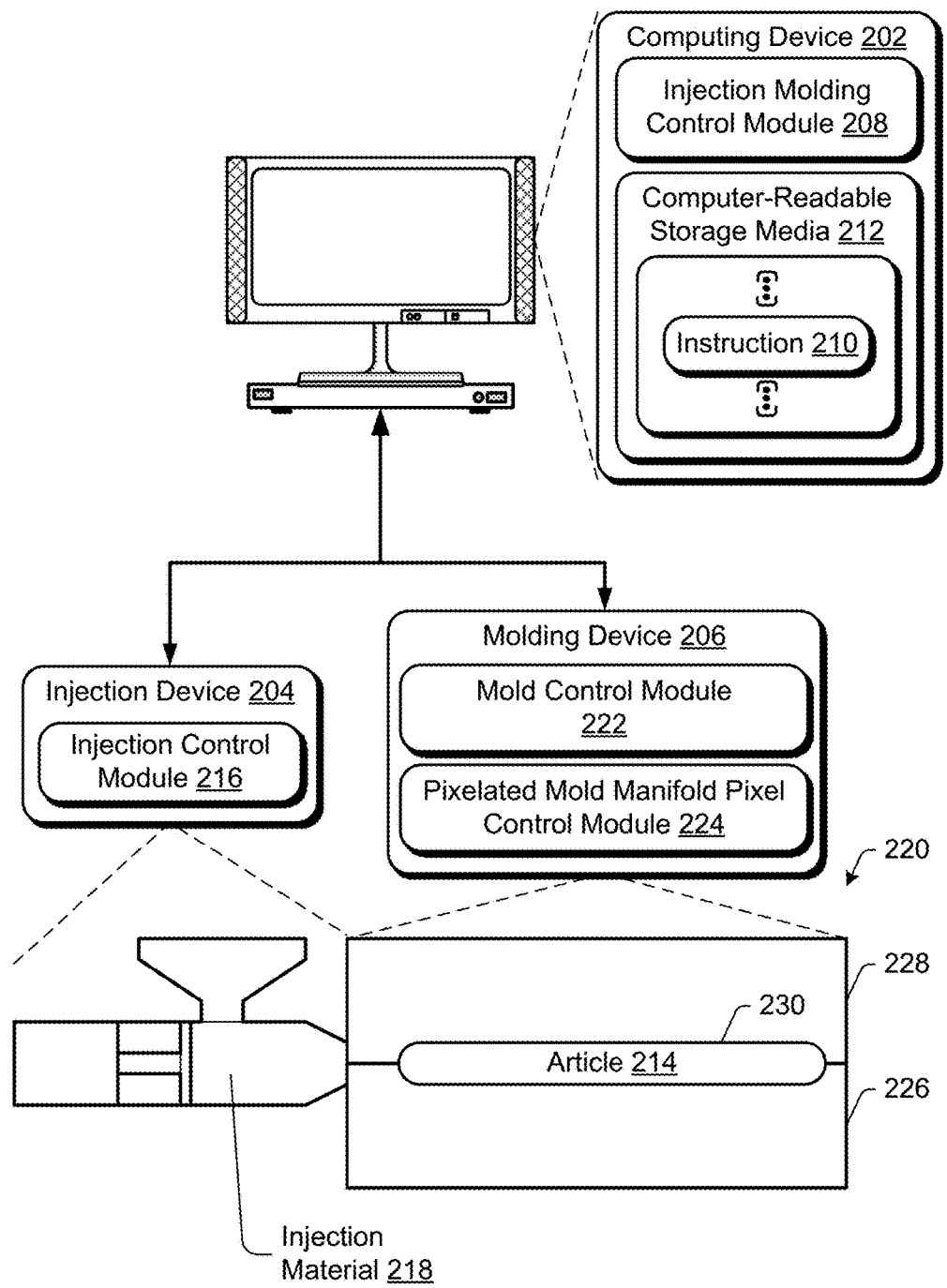
FIG. 2 illustrates an environment in an example implementation that is operable to produce an article from injection molding techniques in accordance with one or more embodiments.

FIG. 2 illustrates an environment in an example implementation showing a system 200 that is operable to produce an article 214 via injection molding techniques described herein. The system 200 includes a computing device 202 that is communicatively coupled to an injection device 204 and a molding device 206. The article 214 can be a variety of different injection-molded articles, such as a light guide (e.g., a light guide 118 of FIG. 1) or other component used in an optics device.

The computing device 202 is illustrated as including an injection molding control module 208, which is representative of functionality to control operation of the injection device 204 and the molding device 206. The injection molding control module 208 may utilize one or more instructions 210 stored on a computer-readable storage media 212. The one or more instructions 210 may then be used to control operation of the injection device 204 and molding device 206 to form the article 214 using injection molding. Computer-readable storage media refers to media and/or devices (e.g., RAM, ROM, EEPROM, flash memory or other memory technology, optical storage devices such as CDs or DVDs, magnetic storage devices such as hard drives, and so forth) that enable persistent storage of information and/or storage that is tangible, in contrast to mere signal transmission, carrier waves, or signals per se. Computer-readable storage media refers to non-signal bearing media.

The injection device 204 includes an injection control module 216 to control heating and injection of an injection material 218 that is to be injected into a mold 220 of the molding device 206. Injection device 204 may include a heating element to heat the injection material 218 to a liquefied state. The injection device 204 employs an injector, such as a plunger or screw type injector, to inject the injection material 218 in liquid form into the mold 220 of the molding device.

The injection material 218 may be any single material having uniform material properties, such as any one of a polycarbonate ("PC"), an acrylic (e.g., Poly(methyl methacrylate) ("PMMA")), a cyclo-olefin polymer ("COP"), and so on. The temperature to which the injection material will be heated will vary based on the material properties of the selected injection material. For example, if the injection material is PC, the injection device 204 will heat the PC to approximately 300 degrees Celsius in order to achieve a liquefied state.

The molding device 206 is illustrated as including a mold control module 222, which is representative of functionality to control operation of the mold 220. The mold 220 includes multiple mold parts 226, 228. Although illustrated as only including two mold parts 226, 228, any number of mold parts may be used. The mold portions 226, 228 when disposed proximal to each other form a cavity 230 that defines the article 214 to be molded. The mold parts 226, 228 may then be moved apart to eject the article 224 from the mold 220. The molding device 206 is illustrated as further including a pixelated mold manifold pixel control module 224, which is described below in further detail with respect to FIG. 3.

Although the pixelated mold manifold pixel control module 224 is illustrated in FIG. 2 as included in molding device 206, alternatively the pixelated mold manifold pixel control module 224 can be implemented separate from the molding device 206. For example, the pixelated mold manifold pixel control module 224 can be implemented at the computing device 202, independent of any applications or modules of the computing device 202 (e.g., as part of an operating system of computing device 202).

Although particular functionality is discussed herein with reference to particular devices or modules, it should be noted that the functionality of individual devices and modules discussed herein can be separated into multiple devices and modules, and/or at least some functionality of multiple devices and modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

As previously described, conventional molding techniques may encounter complications when used to mold an article 214 using injection material 218. For example, an article 214 having walls with a thickness of less than a millimeter may make it difficult to fill an entirety of the cavity 230 to form the article 214 as the injection material 218 may not readily flow through the cavity 230 before cooling. These issues are further complicated when the article 214 includes a variety of different features that are to be formed on part of the wall, it will take longer for the injection material 218 to fill portions of the cavity 230 that correspond to the different features. When the article 214 is a micro structure including walls and features having a thickness of less than 100 micrometers, conventional molding techniques are insufficient and require additional machining to achieve designated wall and feature size tolerances. By implementing a pixelated mold manifold in mold parts 226, 228, a temperature of discrete regions of the mold portions 226, 228 can be controlled to construct high fidelity articles as discussed in more detail below.

Figure 3:
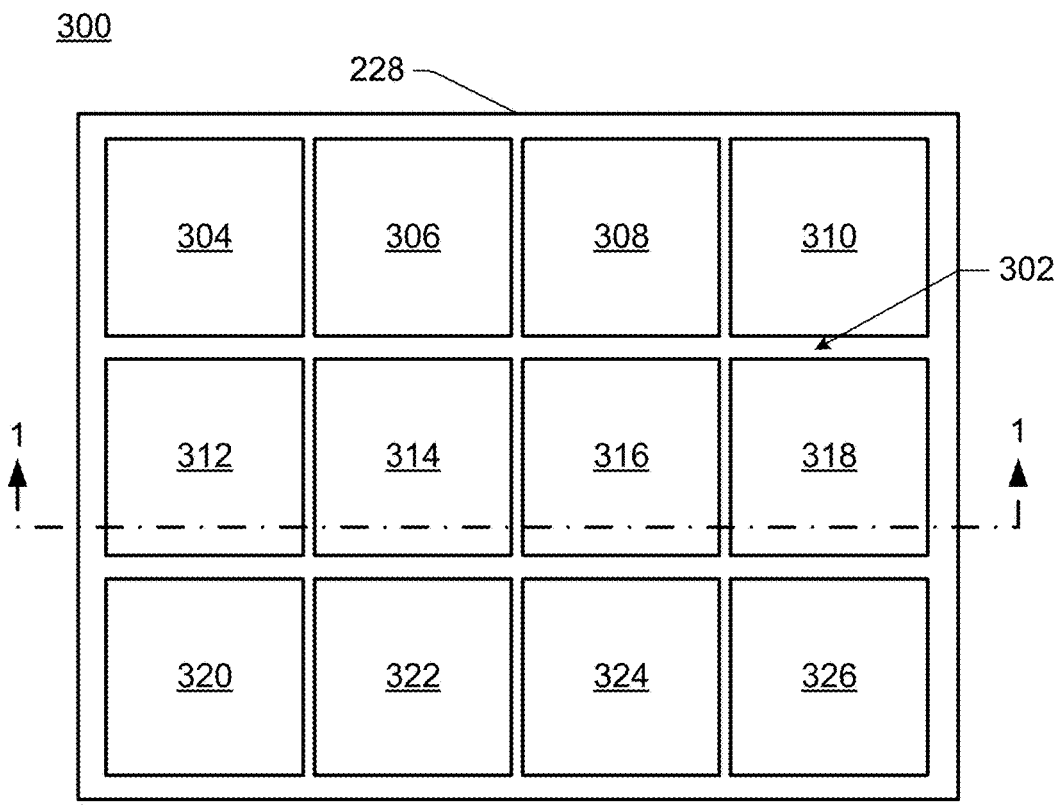
FIG. 3 illustrates an example of a top view of a pixelated mold manifold in accordance with one or more embodiments.

FIG. 3 illustrates an example 300 in which a pixelated mold manifold is employed to selectively control temperatures of discrete regions of a mold 220. FIG. 3 illustrates a top view of mold 220 that includes a pixelated mold part 228 having multiple mold pixels 304, 306, 308, 310, 312, 314, 316, 318, 320, 322, 324, and 326 arranged in an array and divided by multiple mold pixel dividers 302. The mold pixels 304, 306 . . . 326 substantially cover (e.g., cover at least a threshold amount of, such as at least a threshold percentage of or a threshold area of) a surface of the mold part 228 opposite a cavity 230 to be formed by the mold. Although illustrated as squares, mold pixels 304, 306 . . . 326 may be configured in any geometric shape and arranged in any pattern on a surface of the pixelated mold part 228.

Figure 4:
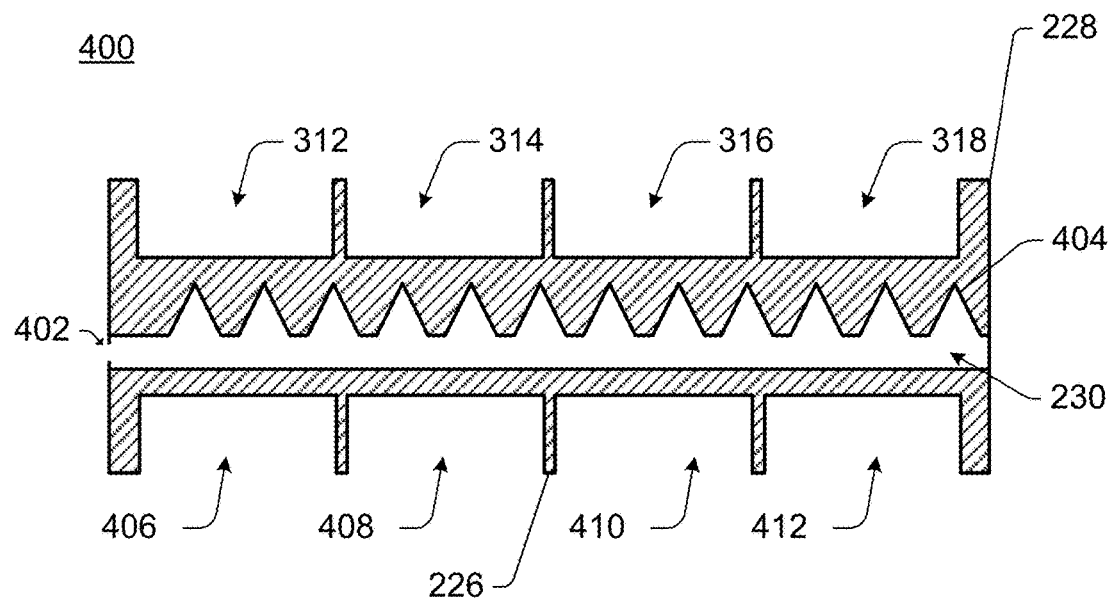
FIG. 4 illustrates an example sectional side view of a pixelated mold manifold in accordance with one or more embodiments.

FIG. 4 illustrates an example 400 of a sectional view of a mold 220 in accordance with one or more embodiments. Specifically, FIG. 4 illustrates a side view of Section 1-1 of mold 220 as depicted in FIG. 3. Mold 220 includes multiple mold parts 228, 226 disposed proximal to one another to form a cavity 230 that defines an article to be molded. Mold part 228 includes mold pixels 312, 314, 316, and 318 disposed on a surface of the mold part 228 opposite the cavity 230. Likewise, mold part 226 includes mold pixels 406, 408, 410, and 412 disposed on a surface of the mold part 226 opposite the cavity 230. Mold pixels 312, 314, 316, 318, 406, 407, 410, 412 are configured to receive heat from a heat source, as described in further detail below, and transfer heat to a corresponding surface of cavity 230 located opposite the mold pixel. Mold 220 further includes an opening 402 that enables the cavity 230 to be filled with the injection material 218 to form an article to be molded. Although mold parts 226 and 228 are both illustrated as including mold pixels configured to receive heat from a heat source, alternatively only one of the mold parts 226, 228 (e.g., only mold part 228) may include mold pixels configured to receive heat from a heat source.

Figure 5:
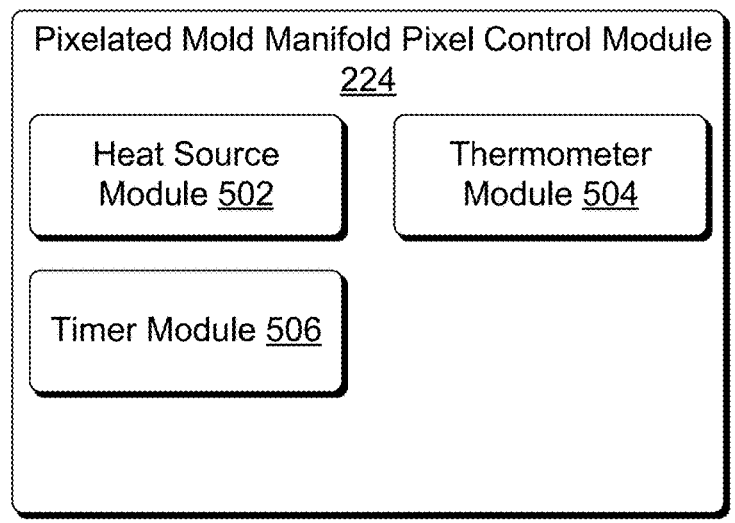
FIG. 5 illustrates an example pixelated mold manifold control module in accordance with one or more embodiments.

FIG. 5 illustrates an example 500 of a pixelated mold manifold pixel control module 224 of a molding device 206 as depicted in FIG. 2. Pixelated mold manifold pixel control module 224 includes a heat source module 502, a thermometer module 504, and a timer module 506.

Pixelated mold manifold pixel control module 224 is configured to selectively control a temperature of each mold pixel of mold parts, for example, mold parts 226, 228 and their respective mold pixels 312, 314, 316, 318, 406, 408, 420, 412, illustrated in FIG. 4. Heat source module 502 is representative of functionality to provide a heat source for selective control of a mold pixel temperature for one or more mold pixels of a mold part. For example, the heat source module 502 is configured to supply an individual heat source for each mold pixel of the mold parts, such that the heat source module 502 may heat each mold pixel of the mold parts to a different temperature. By configuring the heat source module 502 to supply individual heat sources for each mold pixel of the mold parts, heat source module can adjust a temperature of an individual mold pixel without adjusting a temperature of different mold pixels. The heat source module 502 can provide heat by way of any heat source, for example, a hot air gun powered by a ceramic heating element. However, any heat source can be used by heat module 502. Operation of the heat source module 502 with respect to a pixelated mold manifold, (e.g., mold part 228 of FIG. 2) is described in further detail below with respect to FIG. 6.

Thermometer module 504 is representative of functionality to actively measure a temperature of each mold pixel of a pixelated mold manifold, for example, mold pixels of mold parts 228, 226 of FIG. 4, and provide the pixel temperature measurements to the heat source module 502. Heat source module 502 may use these temperature measurements to modulate a temperature of a corresponding pixel.

Timer module 506 is representative of functionality to measure a time of heat application by the heat source module 502 to one or more pixels of a pixelated mold manifold. For example, the heat source module 502 may adjust a temperature of individual pixels of a pixelated mold manifold with a hot air gun powered by a ceramic heater. The heat source module 502 may adjust a temperature of the ceramic heater based on a duty cycle of the hot air gun. The duty cycle of the hot air gun may be a pre-specified interval, for instance, two seconds. The timer module 506 is configured to monitor an active time of the heat source module 502 and provide feedback to the heat source module 502. With timing information provided by the timer module 506 and temperature information provided by the thermometer module 504, the pixelated mold manifold pixel control module 224 can actively and selectively control a temperature of individual mold pixels of a pixelated mold manifold with heat source module 502.

Figure 6:
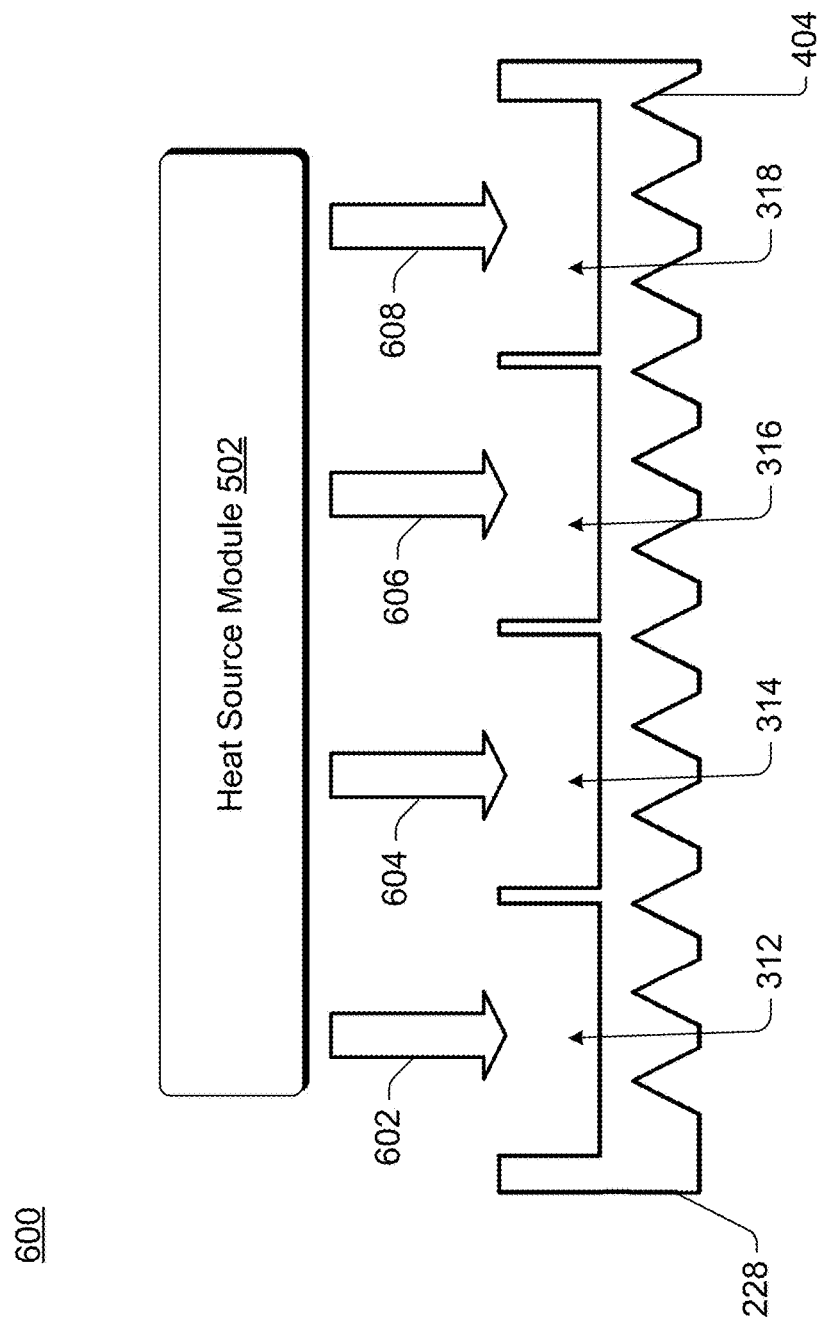
FIG. 6 illustrates an example of selectively applying heat to a pixelated mold manifold in accordance with one or more embodiments.

FIG. 6 illustrates an example 600 of selectively applying heat to individual pixels of a pixelated mold manifold, for instance, mold part 228, in accordance with one or more embodiments. Mold part 228 is depicted in side view and includes multiple mold pixels 312, 314, 316, and 318 disposed on a side of the mold part 228 opposite a cavity to be formed when the mold part 228 is disposed proximal to one or more additional mold parts. In the illustrated example, mold part 228 includes multiple cavity features, for instance, cavity feature 404, disposed on the side of the mold part 228 opposite the mold pixels 312, 314, 316, 318. Cavity feature 404 is configured to define a feature of an article to be formed (e.g., article 214 of FIG. 2) when the cavity is injected with an injection material 218. Mold pixels 312, 314, 316, 318 are configured to receive individual heat sources 602, 604, 606, 608 from heat source module 502. Heat sources 602, 604, 606, 608 may comprise individual flows of hot air from a hot air gun powered by a ceramic heater. A profile of the heat sources 602, 604, 606, 608 (e.g., air flow profile) may be configured to complement a profile of a respective corresponding pixel 312, 314, 316, 318. Heat source module 502 may be configured to selectively adjust a temperature of individual heat sources 602, 604, 606, 608 to provide a controlled temperature adjustment of individual pixels of the mold part 228. For instance, injection molding microstructures involves precise control of a mold temperature in order to maintain an injection material in a molten state during the molding process. An individual mold pixel's temperature may be adjusted to adjust a corresponding temperature of the mold cavity surface opposite the mold pixel. This temperature adjustment may be influenced at least in part based on a corresponding thickness of the cavity opposite the mold pixel. By precisely controlling a temperature of individual pixels 312, 314, 316, 318 with the heat source module 502, an article having precise fidelity to a cavity defined by a mold, for instance mold 220 having mold parts 228 and 226, can be created without requiring additional machining.

Figure 7:
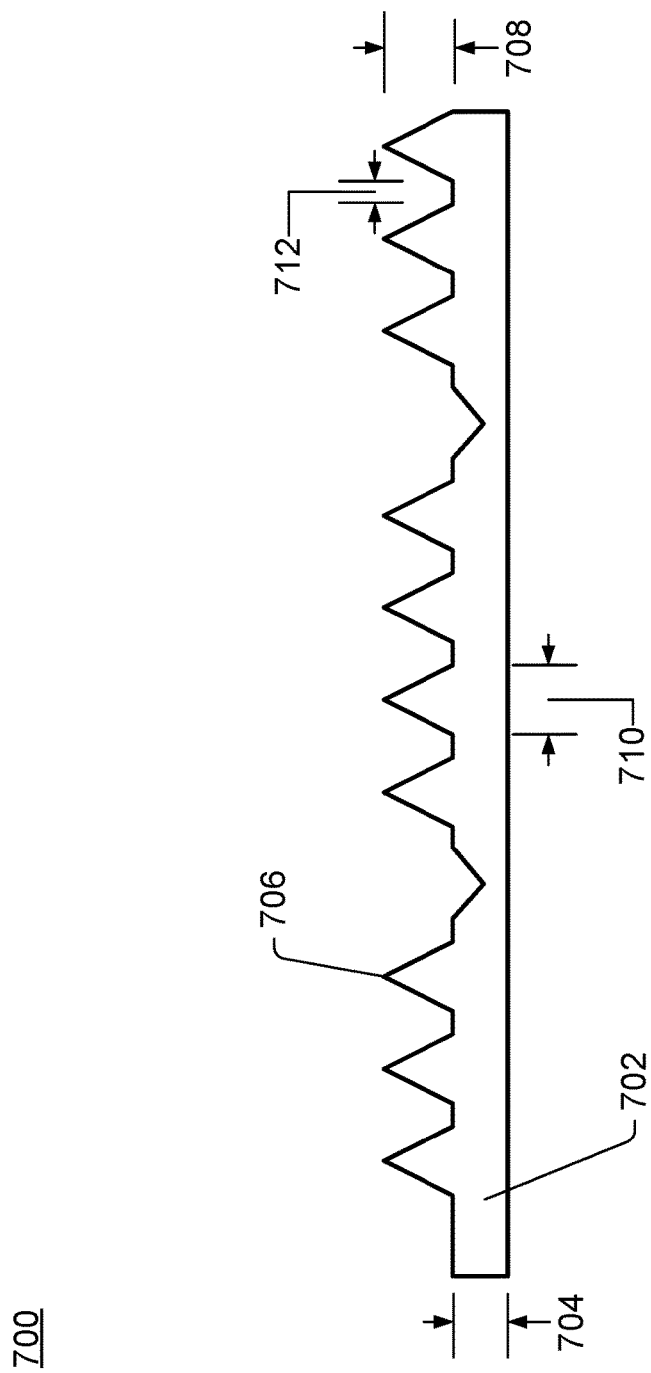
FIG. 7 illustrates an example injection-molded light guide in accordance with one or more embodiments.

FIG. 7 illustrates an example of a side view of an article 700 created by the pixelated mold manifold described herein. Article 700 includes a wall 702 having a thickness 704 and one or more features 706 disposed on the wall and having a length 708. The article 700 is formed by the cavity of multiple mold parts of a mold, for instance, cavity 230 defined by mold parts 226, 228 of mold 220 as illustrated in FIG. 4. The one or more features 706 may be configured as wedges, defined by the one or more cavity features 404 of mold part 228 as illustrated in FIG. 6. In one or more embodiments, the one or more features 706 may be configured as wedges that, when observed from a side view, have a profile resembling an isosceles triangle. For example, the width 710 of a wedge feature 706 may be equal to a length 708 of the wedge feature that extends away from the wall 702 having a thickness 704. The article 700 may be a light guide, for instance, the light guide 118 of computing device 102 as illustrated in FIG. 1.

Although the one or more features 706 are illustrated as having a wedge profile, the one or more features 706 may be configured in any sort of geometry, such as conical features, cylindrical features, dome-shaped features, ramp shaped features, and so on. Additionally or alternatively, the one or more wedge features 706 may protrude into the wall 702 having a thickness 704. Although illustrated as disposed on only one side of article 700, the one or more features 706 may be disposed on either side or both sides of article 700.

Through the use of pixelated mold manifolds as described herein, the article 700 can be molded to replicate the dimensions of the cavity 230 with high fidelity, even when the cavity 230 defines a microstructure article. In one or more embodiments, the article 700 includes a wall 702 having a thickness 704 of less than 700 micrometers. As described herein, a wall of article 700 is defined as a portion of article 700 not including a feature, for instance, feature 706. Feature 706 is defined as having a length 708 of less than 10 micrometers and a width 710 of less than 10 micrometers. The pixelated mold manifold described herein also enables features to be disposed on the wall and separated from other features by a distance 712 of less than 5 micrometers. Although features 706 are described as having lengths of less than 10 micrometers, features 706 may additionally or alternatively have lengths 708 of greater than 10 micrometers.

Although article 700 is illustrated as supporting features 706 having a uniform length 708, feature length 708 may vary with respect to individual features, as defined by a corresponding mold cavity, for instance cavity 230 of mold 220. Likewise, although article 700 is illustrated as having a wall 702 of uniform thickness 704, wall thickness may vary at different locations on article 700, as defined by the corresponding mold cavity. As described herein, uniform thickness refers to thickness that varies by less than a threshold amount, such as by less than 35 micrometers.

Although the pixelated mold manifold described herein enables injection molding of articles having precise fidelity to a corresponding mold cavity, dimensions of the injection-molded article may vary from the dimensions of the corresponding mold cavity on a microscopic level. For instance, conventional injection molding techniques may create a "pillowing" effect in a molded article. In conventional injection molding techniques, a pillowing effect may occur when the force of the injection material into the cavity coupled with heat applied to the mold parts causes a microscopic deformation of the mold cavity that increases in magnitude from an outer edge of a surface of the mold cavity towards a center of a surface of the mold cavity. As a result of this cavity deformation, an injection-molded article is typically thicker at a portion of the article corresponding to a center of a face of a corresponding cavity, and thinner at portions of the article corresponding to an edge of a face of the corresponding cavity. Although this pillowing effect may not be completely eliminated through use of a pixelated mold manifold, the pillowing effect on an injection-molded article produced with a pixelated mold manifold is localized to portions of the injection-molded article based on a pixel area of a corresponding mold part forming a mold cavity.

Figure 8:
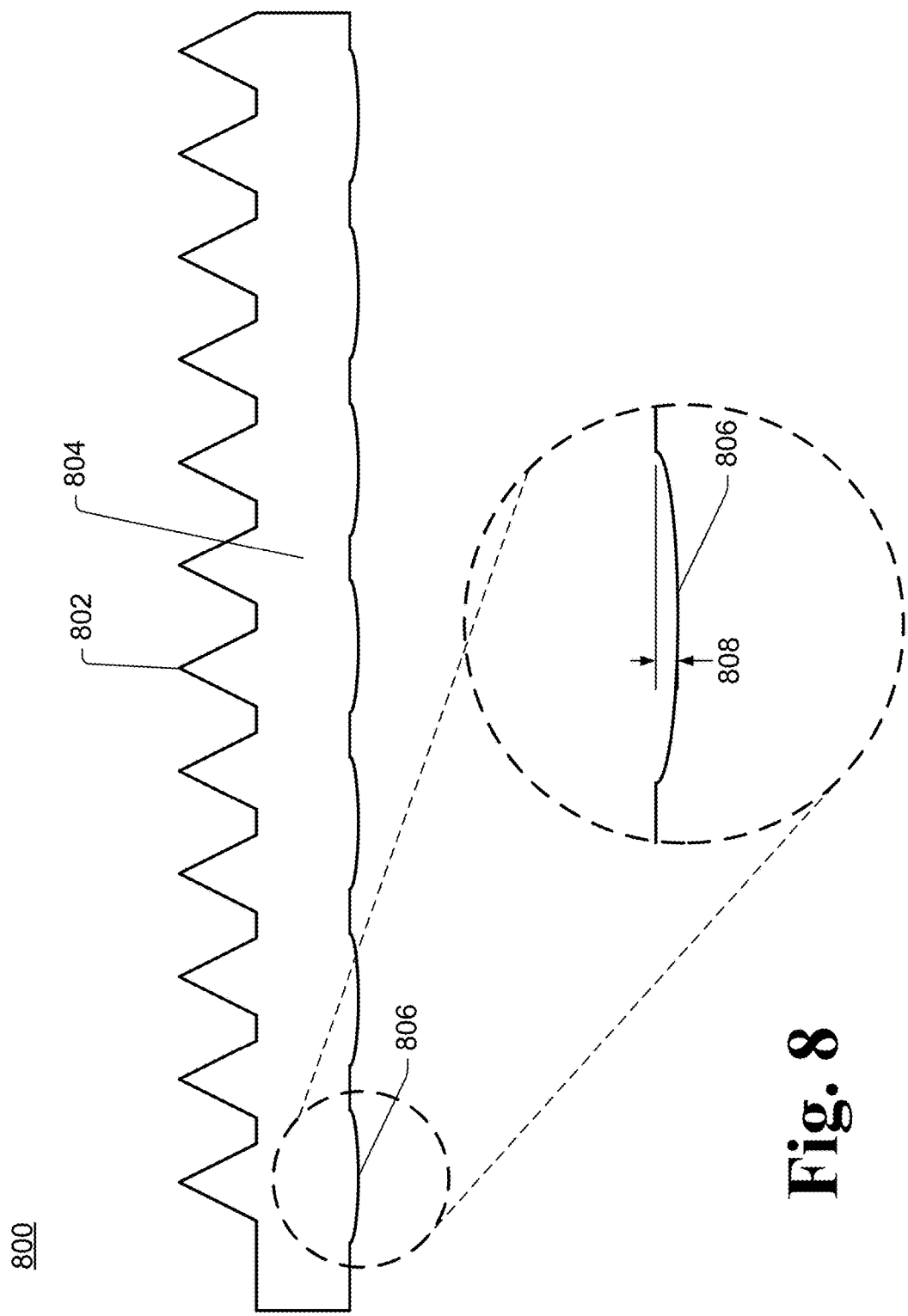
FIG. 8 illustrates an example of a light guide with pixelated pillowing in accordance with one or more embodiments.

FIG. 8 illustrates an example of an injection-molded article 800 with pixelated pillowing in accordance with one or more embodiments. Article 800 includes one or more features 802 and a wall 804 defined by a corresponding mold cavity, for instance cavity 230 defined by mold parts 226, 228 of mold 220 as illustrated in FIG. 4. Returning to FIG. 8, article 800 includes one or more pixelated pillowing regions 806 of a surface of the article 800. A pixelated pillowing region 806 is defined by a surface area of the cavity 230 corresponding to a surface area of a mold part 226, 228 used to form the cavity and on a side of the mold part 226, 228 opposite one or more mold pixels of the mold part 226, 228 (e.g., mold pixels 312, 314, 316, 318, 4016, 408, 410, and 412 as illustrated in FIG. 4). For instance, using the mold cavity 230 of FIG. 4 as an example, the pixelated pillowing region 806 of FIG. 8 is defined by a surface area of the cavity 230 on a surface of mold part 226 corresponding to a surface area of mold pixel 406 on the opposite surface of mold part 226.

Returning to FIG. 8, a pixelated pillowing region 806 includes a thickness variation 808 that is constrained by an area of a corresponding mold pixel. Restricting the area of a pillowing effect through the use of mold pixels allows for greater control in the resulting thickness of article 800. For instance, conventional injection molding techniques result in pillowing deformation regions having thickness variations of hundreds of micrometers on an article intended to be 0.5 millimeters thick. In contrast, by restricting the pillowing effect to regions corresponding to surface areas of mold pixels, thickness variation 808 can be reduced to less than 35 micrometers for an article defined by a cavity having a thickness of 0.5 millimeters. This reduction in thickness variation through the use of a pixelated mold manifold thus achieves highly precise fidelity for injection-molded parts without the need for subsequent machining.

This reduction and localization of the pixelated pillowing is a result of the lower injection pressure required in contrast to traditional injection molding. Because the injection material is injected slowly under low pressure and allowed to flow into every cavity of the mold, there is significantly less pressure on the mold face that causes pillowing. Any pillowing that does occur tends to be localized to the individual pixels with a much smaller magnitude than a pillowing effect across the entire mold face.

Figure 9:
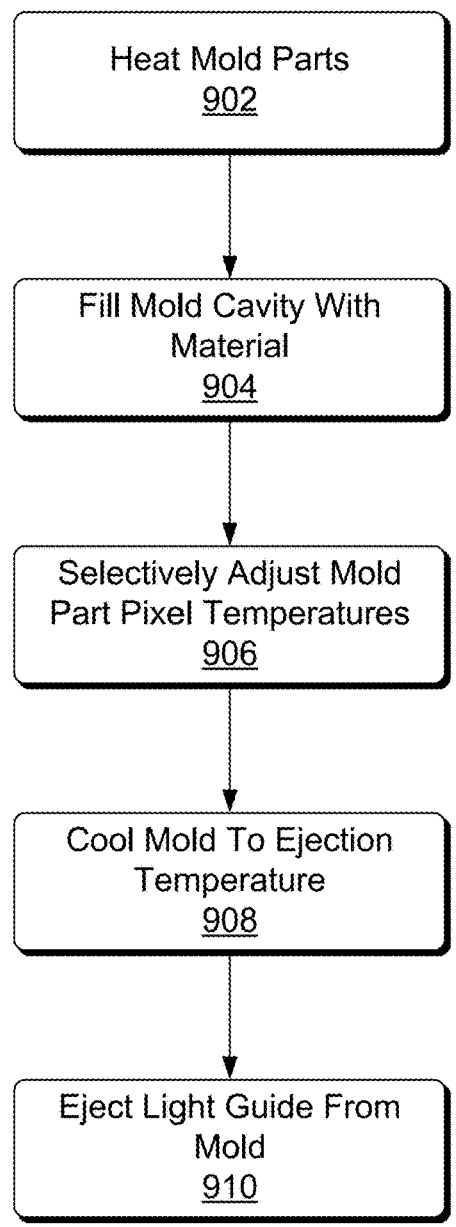
FIG. 9 is a flowchart illustrating an example process for injection molding an article in accordance with one or more embodiments.

FIG. 9 is a flowchart illustrating an example process 900 for injection molding an article in accordance with one or more embodiments. Process 900 can be implemented in software, firmware, hardware, or combinations thereof. For example, process 900 can be implemented by one or a combination of the computing device 202 the injection device 204, and the molding device 206 illustrated in FIG. 2. Process 900 is shown as a set of acts and is not limited to the order shown for performing the operation of various acts. Process 900 is an example process for injection molding an article; additional discussions of injection molding an article are included herein with reference to different figures.

In process 900, mold parts are heated (act 902). Mold parts are heated to a temperature that is sufficient to maintain an injection material that is to be injected into a mold cavity defined by the mold parts in a liquid state. The temperature to which the mold parts are heated is at a minimum a temperature sufficient to prevent the injection material from solidifying upon contact with a mold surface or otherwise prohibiting the injection material from fully propagating to the cavity features defined by the mold cavity.

A temperature to which the mold parts are to be heated will vary based on the material properties of the injection material that is to be injected into the mold cavity. For example, when using a polycarbonate injection material, the mold parts are to be heated to approximately 290 degrees Celsius. Additionally, a clamp force that holds the mold parts together will vary based on the selected injection material. For example, using the techniques described herein, a polycarbonate injection material requires a clamp force of approximately 266 metric tons to hold the mold parts together.

The mold cavity is then filled with the injection material (act 904). A pressure at which injection material is injected into the mold cavity and a duration during which the injection material is injected into the mold cavity will vary depending on the selected injection material, the volume of the mold cavity, and the wall thickness of an article to be formed. For example, for a polycarbonate injection material injected into a mold cavity having a total volume of 30 cubic centimeters and defining an article with a wall thickness of approximately 650 micrometers, the polycarbonate will be injected at a pressure of 58 MPa for approximately 0.8 to 1.8 seconds, until the mold cavity is filled.

When the mold cavity is filled with the injection material, individual temperatures of mold pixels of the mold parts are adjusted (act 906). Selectively adjusting a temperature of a mold pixel may include lowering a temperature of a mold pixel corresponding to a region of the mold cavity supporting thicker cavity features more rapidly than lowering a temperature of a mold pixel corresponding to a region of the mold cavity supporting thinner cavity features.

Additionally or alternatively, selectively adjusting a temperature of a mold pixel may include lowering a temperature of central mold pixels more rapidly than lowering a temperature of a mold pixel disposed toward the edge of a mold part. For example, returning to FIG. 3, a temperature of mold pixels 314 and 316 may be lowered more rapidly than a temperature of mold pixels 304, 306, 308, 310, 312, 318, 320, 322, 324, and 326. Selectively adjusting a temperature of individual mold pixels ensures that the injection material conforms to the mold cavity with high fidelity. Additionally, by selectively adjusting a temperature of individual mold pixels, the resulting light guide formed from the injection material will have uniform internal stresses throughout independent of thickness variations.

Additionally or alternatively, selectively adjusting a temperature of individual mold pixels may include adjusting a temperature of all pixels of a first mold part more rapidly than adjusting a temperature of all pixels of a second mold part. For example, returning to FIG. 4, a temperature of pixels 406, 408, 410, 412 of mold part 226 may be lowered more rapidly than a temperature of pixels 312, 314, 316, and 318 of mold part 228. By selectively lowering the temperature of mold part 226's pixels more rapidly than a temperature of mold part 228's pixels, mold part 226 may be separated from the injection material filling the mold cavity without removing the injection material from mold part 228. This separation of the mold parts while a portion of the injection material remains in a semi-molten state may allow for additional ease in removal of the injection material before it solidifies into a light guide.

Returning to FIG. 9, the mold parts are then cooled to an ejection temperature (act 908). The ejection temperature will vary based on the material properties of the injection material that was injected into the mold cavity. The ejection temperature may be any temperature that is low enough to allow for removal of the solidified light guide from the multiple mold parts without damaging a structure of the light guide.

Once the mold is cooled to the ejection temperature, the light guide is ejected from the mold (act 910).

In the discussions herein, various different embodiments are described. Each embodiment described herein can be used on its own or in connection with one or more other embodiments described herein. Further aspects of the techniques discussed herein relate to one or more of the following embodiments.

A light guide comprising: a wall; and multiple wedge features disposed on one or more surfaces of the wall, the wall and the multiple wedge features being formed as a single article of a uniform material and configured to receive light and reflect the received light to a display surface.

Alternatively or in addition to the above described light guides, any one or combination of: wherein a thickness of the wall and the multiple wedge features are defined by a mold and the uniform material comprises an injection material injected into the mold; wherein the injection material comprises only one of a plastic, a polycarbonate, or an acrylic; wherein the light guide includes deformations of less than 32 micrometers from a cavity of the mold defining the thickness of the wall and multiple wedge features; wherein individual ones of the multiple wedge features have individual respective lengths, extending away from the wall or protruding into the wall, of less than 50 micrometers; wherein the wall has a uniform thickness; wherein one or more of the multiple wedge features extend away from one or more surfaces of the wall and one or more of the multiple wedge features protrude into one or more surfaces of the wall; the light guide further comprising multiple pixelated pillowing deformation regions; the light guide embodied in a head-mounted display; individual ones of the multiple wedge features are each separated from adjacent wedge features by less than 10 micrometers.

An optics device comprising: an illuminator; a display surface; and a micro light guide optically coupled to the illuminator and the display surface, the micro light guide configured to receive light from the illuminator and reflect the received light to the display surface, the micro light guide having been formed as a single article of a uniform injection material and the micro light guide comprising: a wall; and multiple wedge features disposed on one or more surfaces of the wall.

Alternatively or in addition to the above described optics devices, any one or combination of: wherein the multiple features disposed on one or more surfaces of the wall have individual respective lengths, extending away from the wall or protruding into the wall, of less than 50 micrometers; wherein the wall is configured to have a thickness of less than 700 micrometers; wherein a thickness of the micro light guide is defined by a cavity of a mold configured to receive a heated injection material, the mold configured to cool the heated injection material to form the micro light guide; wherein the micro light guide has a thickness including deformations of less than 32 micrometers from a thickness of the cavity of the mold, the deformations occurring on a surface of the micro light guide and arranged in multiple pixelated pillowing deformation regions; wherein the heated injection material comprises only one of: a plastic, a polycarbonate, or an acrylic; wherein one or more of the multiple features extend away from one or more surfaces of the wall and one or more of the multiple features protrude into one or more surfaces of the wall.

A computing device having a handheld form factor, the computing device comprising: an illuminator; a display surface; and a micro light guide optically coupled to the illuminator and the display surface, the micro light guide configured to receive light from the illuminator and reflect the received light to the display surface, the micro light guide comprising: a wall; and multiple features disposed on one or more surfaces of the wall, the multiple features having individual respective lengths, extending away from the wall or protruding into the wall, of less than 50 micrometers.

Alternatively or in addition to the above described computing devices, any one or combination of: wherein a thickness of the micro light guide is defined by a cavity of a mold configured to receive a heated injection material, the mold configured to cool the heated injection material to form the micro light guide having a thickness including deformations of less than 32 micrometers from a thickness of the cavity of the mold, the deformations occurring on a surface of the micro light guide and arranged in multiple pixelated pillowing deformation regions; wherein the heated injection material comprises only one of: a plastic, a polycarbonate, or an acrylic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A light guide comprising:
    a wall;
    multiple wedge features disposed on a first surface of the wall, the multiple wedge features configured to reflect light received from the wall to a display surface; and
    multiple uniform convex pixelated pillowing deformation regions disposed in a uniform array spanning a first direction and a second direction that is generally perpendicular to the first direction on a second surface of the wall opposite the multiple wedge features, each deformation region encompassed by a non-protruding planar region on the second surface of the wall throughout the uniform array, wherein
    the wall, the multiple uniform convex pixelated pillowing deformation regions, and the multiple wedge features are formed as a single article of a uniform material.

2. The light guide of claim 1, wherein a thickness of the wall and the multiple wedge features are formed by a mold and the uniform material comprises an injection material injected into the mold.

3. The light guide of claim 2, wherein the injection material comprises:
    a plastic;
    a polycarbonate; or
    an acrylic.

4. The light guide of claim 2, wherein the multiple uniform convex pixelated pillowing deformation regions comprise deformations of less than 32 micrometers from a cavity of the mold defining the thickness of the wall and the multiple wedge features.

5. The light guide of claim 1, wherein individual ones of the multiple wedge features have individual respective lengths, extending away from the wall or protruding into the wall, of less than 50 micrometers.

6. The light guide of claim 1, wherein portions of the wall that do not include the multiple wedge features or the multiple uniform convex pixelated pillowing deformation regions are of a uniform thickness.

7. The light guide of claim 1, wherein one or more of the multiple wedge features extend away from the surface of the wall upon which the multiple wedge features are disposed and one or more of the multiple wedge features protrude into the surface of the wall upon which the multiple wedge features are disposed.

8. The light guide of claim 1, wherein individual ones of the multiple wedge features are each separated from adjacent wedge features by less than 10 micrometers.

9. An optics device comprising:
    an illuminator;
    a display surface; and
    a micro light guide optically coupled to the illuminator and the display surface, the micro light guide configured to receive light from the illuminator and reflect the received light to the display surface, the micro light guide formed as a single article of a uniform injection material and the micro light guide comprising:
    a wall;
    multiple wedge features disposed on a first surface of the wall configured to reflect the received light to the display surface; and
    multiple uniform convex pixelated pillowing deformation regions disposed in a uniform array spanning a first direction and a second direction that is generally perpendicular to the first direction on a second surface of the wall opposite the multiple wedge features, each deformation region encompassed by a non-protruding planar region on the second surface of the wall throughout the uniform array.

10. The optics device of claim 9, wherein the multiple wedge features disposed on the surface of the wall have individual respective lengths, extending away from the wall or protruding into the wall, of less than 50 micrometers.

11. The optics device of claim 9, wherein the wall is configured to have a thickness of less than 700 micrometers.

12. The optics device of claim 9, wherein the micro light guide is formed by a mold, and
    wherein a thickness of the micro light guide is defined by a cavity of the mold configured to receive a heated injection material, the mold configured to cool the heated injection material to form the micro light guide.

13. The optics device of claim 12, wherein the multiple uniform convex pixelated pillowing deformation regions comprise deformations of less than 32 micrometers from a thickness of the cavity of the mold.

14. The optics device of claim 12, wherein the heated injection material comprises:
    a plastic;
    a polycarbonate; or
    an acrylic.

15. The optics device of claim 9, wherein one or more of the multiple wedge features extend away from the surface of the wall and one or more of the multiple wedge features protrude into the surface of the wall.

16. A computing device having a handheld form factor, the computing device comprising:
- an illuminator;
- a display surface; and
- a micro light guide optically coupled to the illuminator and the display surface, the micro light guide configured to receive light from the illuminator and reflect the received light to the display surface, the micro light guide comprising:
  - a wall;
  - multiple wedge features disposed on a first surface of the wall configured to reflect light to the display surface, the multiple wedge features having individual respective lengths, extending away from the wall or protruding into the wall, of less than 50 micrometers; and
  - multiple uniform convex pixelated pillowing deformation regions disposed in a uniform array spanning a first direction and a second direction that is generally perpendicular to the first direction on a second surface of the wall opposite the multiple wedge features, each deformation region encompassed by a non-protruding planar region on the second surface of the wall throughout the uniform array, wherein the wall, the multiple uniform convex pixelated pillowing deformation regions, and the multiple wedge features are formed as a single article of a uniform material.

17. The computing device of claim 16, wherein the micro light guide is formed by a mold, and wherein a thickness of the micro light guide is defined by a cavity of the mold configured to receive a heated injection material, the mold configured to cool the heated injection material to form the micro light guide such that the multiple uniform convex pixelated pillowing deformation regions comprise deformations of less than 32 micrometers from a thickness of the cavity of the mold.

18. The computing device of claim 17, wherein the heated injection material comprises:
- a plastic;
- a polycarbonate; or
- an acrylic.

19. The computing device of claim 16, wherein at least one of the multiple wedge features extends away from the surface of the wall upon which the multiple wedge features are disposed and at least one of the multiple wedge features protrudes into the wall upon which the multiple wedge features are disposed.

20. The computing device of claim 16, wherein a deformation of each of the multiple uniform convex pixelated pillowing deformation regions decreases in magnitude from a center of the pixelated pillowing deformation region to an edge of the pixelated pillowing deformation region in both the first and second directions.

* * * * *